UNITED STATES PATENT OFFICE.

CHARLES A. GORDON, OF CINCINNATI, OHIO, ASSIGNOR TO JAMES E. MOONEY, OF DECATUR, ALABAMA.

MANUFACTURE OF MERCHANTABLE STARCH.

SPECIFICATION forming part of Letters Patent No. 595,058, dated December 7, 1897.

Application filed October 7, 1896. Serial No. 608,092. (No specimens.)

*To all whom it may concern:*

Be it known that I, CHARLES A. GORDON, a citizen of the United States, residing at Cincinnati, in the county of Hamilton, State of Ohio, have invented a new and useful Process of Making Merchantable Starch, of which the following is a specification.

My process relates to the treatment of the starch after it has been separated from the grain and is in the form of "run" or "wet" starch. In this form it contains from fifty to sixty per cent. of water. To expel this moisture, various processes are used—such as draining, drying, crusting, the use of centrifugal machines, &c.—all of which are either more or less unsatisfactory as to the result or involve a long and tedious operation and the employment of an extensive and costly plant.

The first step of my improved process is to take the starch directly from the run and submit the same to direct pressure in any suitable form of press. This expels the moisture and at the same time reduces the starch to a pulverulent homogeneous state. In this condition it is a merchantable article and is in the condition usually known as "mill-starch." If I desire to make mill-starch only, the process ceases at this point.

If lump-starch is desired, further steps are necessary. In that case after pressing the run starch till it retains only about twenty per cent. of the water I place the pressed starch above noted in a mixing-machine having means for heating its contents—such, for example, as the well-known steam-jacketed device in common use. The starch is thoroughly stirred, a suitable temperature, say 100° to 150° Fahrenheit, being maintained. At the close of this operation it is in the form of a fine homogeneous coherent powder. The starch in this form is placed in any suitable press and pressure applied. It is then left to cool, the pressure being maintained during the time of cooling. This completes the process and the starch is in the form of a cake, is of fine grain, homogeneous throughout, and entirely free from lumps or lumpy matter. The cake can be broken into lumps or cut into cubes or any desired form and boxed for shipment.

It will be seen that my process is very simple and expeditious as compared with those heretofore known. By it I am enabled to dispense with expensive machinery and an extensive plant. I also make a very material saving in the amount of time necessary to manufacture starch. In all of the processes heretofore known or used several days were necessary to complete the operation, and in the most commonly-practiced process eighteen days are necessary to produce lump-starch from the run or wet starch. By my process the operation takes but twenty-four hours. The greatest saving of time is made by the use of direct pressure for expelling the moisture from the run starch instead of the processes heretofore used.

Allowing the starch to cool under pressure is also an important step in my process, not only because of the saving of time and of the expense of drying-ovens and accessories, but because to this step is largely due the fine grain and superior quality of the finished starch. It will be evident that I may make lump-starch from the ordinary powdered starch of commerce and treat it as herein stated—*i. e.*, the proper amount of moisture is added to the powdered starch. It is then stirred, heated, pressed, and allowed to cool under pressure, as above described.

I claim—

1. In the process of making starch the step which consists in taking the starch as it comes from the runs and submitting the same to direct pressure whereby the excess of moisture is expelled and the starch reduced to a powdered state, substantially as described.

2. In the process of making starch the sub-process of treating the aforesaid "run" or "wet" starch which consists in submitting the same to direct pressure as set forth, to expel the excess of moisture, then stirring and heating it whereby it is reduced to a fine, homogeneous, coherent powder, substantially as described.

3. The process of treating starch which consists in heating powdered starch containing the proper amount of moisture, pressing the heated starch by direct pressure and allowing it to cool under such pressure, substantially as described.

4. The process of making lump-starch from

"run" starch which consists in first compressing the starch as it comes from the "runs" until the proper amount of moisture is expelled, second heating the starch, third applying direct pressure, and fourth allowing it to cool under such pressure, substantially as described.

5. A step in the process of making lump-starch which consists in causing the compressed heated starch to cool under pressure by which it comes out in the form of a solid cake which is entirely free from lumps of even fine grain, free from air-bubbles or blow-holes, substantially as described.

CHARLES A. GORDON.

Attest:
JOHN E. FITZPATRICK,
CHARLES Y. SPIEGEL.